United States Patent
Ono et al.

Patent Number: 6,089,756
Date of Patent: Jul. 18, 2000

[54] PLAIN BEARING

[75] Inventors: Akira Ono; Hideyumi Matsumura; Masayuki Niwa; Shoji Nawa; Takayuki Shibayama, all of Nagoya, Japan

[73] Assignee: Daido Metal Company Ltd., Nagoya, Japan

[21] Appl. No.: 09/038,825

[22] Filed: Mar. 12, 1998

[30] Foreign Application Priority Data

Mar. 18, 1997 [JP] Japan ................................. 9-085910

[51] Int. Cl.⁷ .............................. F16C 1/00; F16C 33/02
[52] U.S. Cl. ...................... 384/322; 384/283; 384/291; 384/625
[58] Field of Search ................................. 384/107, 283, 384/286, 114, 100, 291, 276, 322, 373, 292, 398, 625

[56] References Cited

U.S. PATENT DOCUMENTS

| 4,274,684 | 6/1981 | Richfield . |
| 5,337,374 | 8/1994 | Konishikawa . |

FOREIGN PATENT DOCUMENTS

| 59-73620 | 4/1984 | Japan . |
| 63-53922 | 4/1988 | Japan . |
| 63-62621 | 4/1988 | Japan . |
| 524128 | 7/1940 | United Kingdom . |
| 731435 | 6/1955 | United Kingdom . |
| 1456504 | 11/1976 | United Kingdom . |
| 2216199 | 10/1989 | United Kingdom . |

*Primary Examiner*—David A. Bucci
*Assistant Examiner*—Marcus Charles
*Attorney, Agent, or Firm*—Browdy and Neimark

[57] ABSTRACT

There are provided a plain bearing which is excellent in oil retaining property and wear-resistant property. The plain bearing has a number of fine grooves which are parallely formed with one another and extending in the circumferential direction on the inner surface of the bearing, the fine grooves comprising deep grooves and shallow grooves. When this bearing is used as a plain bearing, a large amount of lubricating oil can be retained in the deep grooves and the shallow grooves so that a plain bearing which is excellent in anti-seizure property and wear-resistant property can be obtained. Further, even if the shallow grooves will have been worn out by wear and tear during use of extended period of time, the anti-seizure property and the wear-resistant property can be stably maintained by the lubricating oil retained in the deep grooves.

4 Claims, 3 Drawing Sheets

PLAIN BEARING

BACKGROUND OF THE INVENTION

This invention relates to a cylindrical plain bearing for rotatably supporting a rotating shaft.

A plain bearing for rotatably supporting a rotating shaft is formed to a cylindlical shape so as to be fitted on the inner surface of a housing. Frictional wear and seizure of this plain bearing are suppressed by the lubricating effect and cooling effect of the lubricating oil, which are supplied into a clearance between the inner surface of this plain bearing and the rotating shaft, and the noise suppressing effect can also be brought about by the buffer or damper action of the lubricating oil. As the thickness of an oil film to be formed between the inner surface of the plain bearing and the rotating shaft becomes thicker, that is to say, as the amount of the lubricating oil further increases, the above-mentioned suppressing effect produces good results.

In order to increase the amount of the lubricating oil to be retained, it had been made to provide a plain bearing having a number of fine grooves which are circumferentially formed with on the inner surface of the bearing, the fine grooves being parallel with one another and being arranged to extend in the axial direction of the plain bearing, the fine grooves having a depth of several micro meters ($\mu$m).

JP-A-59-73620 discloses a plain bearing having a number of fine grooves which are circumferentially formed on the whole inner surface of the bearing, the fine grooves being arranged in the axial direction of the bearing and being inclined at an angle of 0 to about 5 degrees relative to the circumferential direction of the bearing. This arrangement allows a large amount of lubricating oil to be supplied into the fine grooves, thereby promoting the heat dissipation (Prior Art 1).

JP-U-63-53922 discloses a plain bearing having a number of fine grooves which are circumferentially formed on the inner surface of the bearing, the fine grooves being arranged to extend in the axial direction of the plain bearing, thereby having a large proportion of sliding surface area which is obtained by making the fine grooves in the vicinity of both ends of bearing metals in a larger pitch than those of the axial central portion of the bearing metals. With this arrangement, the lowering in the durability of the bearing is intended to be suppressed by reducing the number of the fine grooves in the vicinity of the both ends of the bearing, where the rotating shaft is in partial contact with the bearing, thereby preventing the decrease in the area which is subjected to the axial loading due to the formation of the fine grooves, as much as possible, so as to reduce the specific load (Prior Art 2).

P-U-63-62621 discloses a plain bearing having fine grooves which are circumferentially formed on the inner surface of the bearing, the fine grooves being arranged to extend in the axial direction of the plain bearing, the fine grooves in the vicinity of both ends of bearing metals being arranged in a deeper depth than those of the axial central portion of the bearing metal. In this Prior Art 3, a line connecting the leading ends of the fine grooves (the bottom portions of the fine grooves) is barrel-shaped so that the depth of the fine grooves in the vicinity of the both ends of the bearing is deeper than those of the rest of the bearing. With this arrangement, in contrast with the Prior Art 2, the amount of the lubricating oil in the both ends which are subjected to a high shock loading due to a partial contact of a rotating shaft is increased to thereby suppress the heat generation in the both ends of the bearing metals (Prior Art 3).

In these Prior Arts 1 to 3, every plain bearing has a number of fine grooves which are circumferentially formed on the inner surface of the bearing, the fine grooves being arranged to extend in the axial direction of the plain bearing, each of side wall portions of the fine grooves functioning as a bank in the axial direction of the bearing. Each of the side wall portions may offer a resistance when the lubricating oil outflowing in the axial direction of the bearing, to thereby prevent an inflow pressure from dropping when the lubricating oil flowing into a clearance between the inner surface of the bearing and the rotating shaft and also allow a large amount of lubricating oil to flow through the fine grooves so as to promote the heat dissipation.

However, if such a bearing is used during a long period of time, the fine grooves will be worn out due to the progress of wear and tear. At the same time, the effect of anti-seizure property and wear-resistant property will be lost rapidly. Particularly, in the Prior Art 3, though the fine grooves in the vicinity of the both ends of the bearing are deeply formed, since those fine grooves will wear out preferentially due to a partial contact of the rotating shaft, the other fine grooves will be worn out by wear and tear, almost concurrently with the wear out of the fine grooves in the vicinity of the both ends of the bearing.

SUMMARY OF THE INVENTION

With the above-mentioned problems in view, upon paying attention to the depth of the fine grooves formed in the circumferential direction on the inner surface of the bearing, it is an object of the present invention to provide a plain bearing which is excellent in wear-resistant property and has a stable oil retaining property during use of extended period of time.

According to the feature of the present invention, there is provided a plain bearing having a number of fine grooves which are circumferentially formed on the inner surface of the plain bearing, the fine grooves being parallel with one another and being arranged to extend at predetermined intervals in the axial direction of the plain bearing, wherein the fine grooves comprise deep-depth grooves (which will be referred to simply as deep grooves hereinbelow) and shallow-depth grooves (which will be referred to simply as shallow grooves hereinbelow).

With this arrangement, when the bearing is used as a plain bearing, a large amount of lubricating oil is retained in both the deep grooves and the shallow grooves. Particularly, each bank action of side wall portions defined between the fine grooves offers a resistance when the lubricating oil outflowing in the axial direction of the bearing and thus an inflow pressure when the lubricating oil flowing into a clearance between the inner surface of the bearing and the rotating shaft increases so that the thickness of an oil film to be formed between the inner surface of the bearing and the rotating shaft becomes thicker. Accordingly, the bearing and its associated rotating parts can be prevented from seizure, thereby providing a plain bearing which is excellent in anti-seizure property and wear-resistant property. Further, even when the shallow grooves will have been worn out by wear and tear during a long time, the anti-seizure property and the wear-resistant property can be stably maintained by the lubricating oil retained in the deep grooves.

According to another feature of the present invention, there is provided a plain bearing having a number of fine grooves which are circumferentially formed on the inner surface of the bearing the fine grooves being parallel with one another and being arranged to extend at predetermined intervals in the axial direction of the plain bearing, wherein the fine grooves comprise a plurality of groove groups, one of the groove groups including one or more of deep grooves and a plurality of shallow grooves.

This arrangement of the bearing can be easily processed by boring work, for example, using a cutting tool having one or more cutting edges to cut a plurality of grooves simultaneously or using a combination of a plurality of cutting tools.

According to still another feature of the present invention, there is provided a plain bearing having a number of fine grooves which are circumferentially formed on the inner surface of the plain bearing, the fine grooves being parallel with one another and being arranged to extend at predetermined intervals in the axial direction of the plain bearing, wherein a number of deep grooves are formed in the vicinity of the axial both ends of the bearing, while a number of shallow grooves are formed in the axial central portion of the bearing.

With this arrangement, a large amount of lubricating oil is supplied to the both ends of the bearing so that the conformability and the wear-resistant property of the bearing can be further enhanced.

DETAILED DESCRIPTION OF THE PREFERRED EMBODIMENTS

Plain bearings for use in crank shafts of high-load diesel engines among internal combustion engines, in which two pieces of bearing metals 10a, 10b each having a semi-cylindrical shape are combined into an assembly having a cylindrical shape, will be described in detail hereinbelow.

Figure 1:
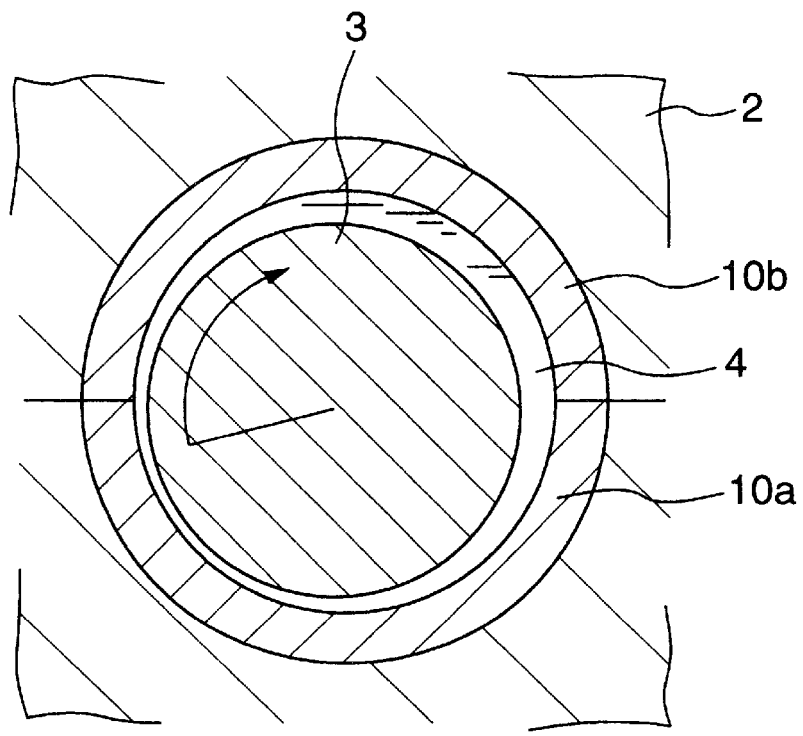
FIG. 1 is a sectional view showing a condition when using a plain bearing.

FIG. 1 shows the condition when two pieces of bearing metals 10a, 10b are combined into an assembly having a cylindrical shape which is fitted in a housing 2 of a plain bearing. The clearance between the bearing metals 10a, 10b and a rotating shaft 3 is supplied with lubricating oil 4. The inner surface of the bearing metal 10a which is put to use in this manner is lined with a sliding material such as, for example, a copper alloy, an aluminum alloy, a tin alloy, or a lead alloy, in order to satisfy the bearing properties of the plain bearing such as the wear-resistant property and the like, and also may be overlaid with a tin alloy, a lead alloy, or a synthetic resin, if need be.

Figure 2:
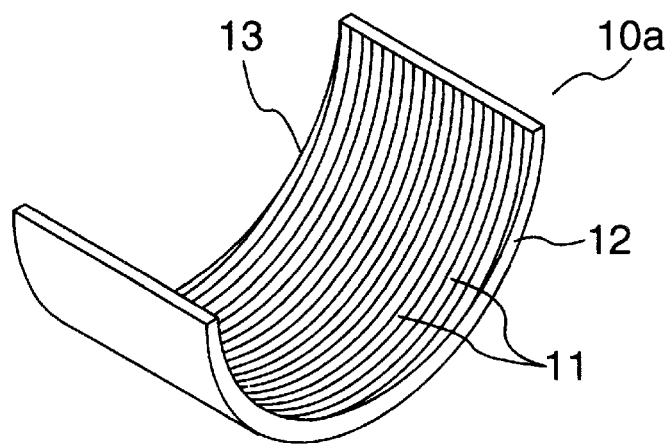
FIG. 2 is a perspective view of a bearing metal.

Further, as shown in FIG. 2, each of the inner surfaces of the bearing metals 10a, 10b has a plurality of fine grooves 11 which are circumferentially spirally formed at a pitch of about 0.2 mm on the inner surface of the bearing metals between the axial both ends thereof, the fine grooves being parallel with one another and being arranged in the direction inclined at an angle of 3 degrees relative to the circumferencial direction perpendicular to the axial direction of the bearing. Further, the fine grooves 11 are formed either by boring work or by photo-etching. In case of forming the fine grooves 11 by boring work, a plurality of grooves 11 are formed by making a groove group including several grooves as a unit when processing the grooves and cutting the inner surface of the bearing with either one cutting tool having one or more cutting edges adapted to cut a plurality of grooves simultaneously, or a combination of a plurality of cutting tools. By forming the fine grooves 11 in this manner, in the axial direction of the bearing metal 10a, there are repeatedly formed a plurality of groups comprising two deep grooves 15, 15 each having a depth D of 7 micro meters ($\mu$m), and three consecutive shallow grooves 16, 16, 16 between the former grooves 15, 15, each of the latter grooves 16 having a depth d of 2 micro meters ($\mu$m) (Refer to FIG. 3).

Figure 4:
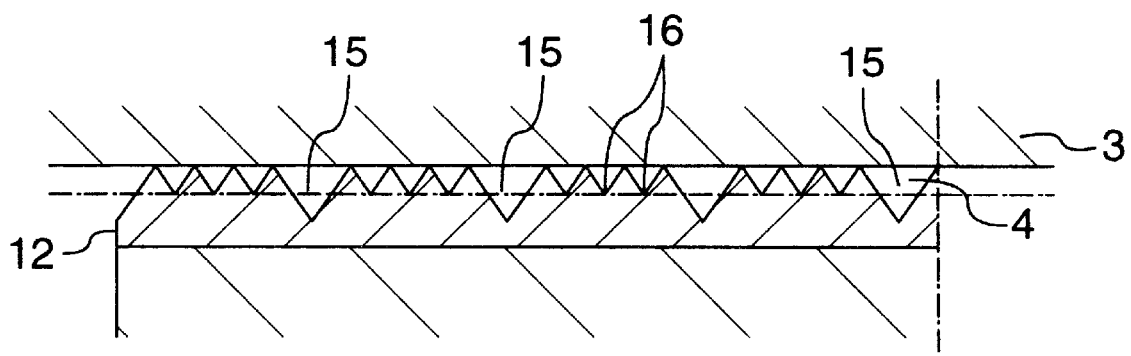
FIG. 4 is a sectional view of a portion of a bearing metal showing the working thereof.

As shown in FIG. 4, when the bearing metal 10a is fitted to the housing 2, and then put to use, during the initial running-in, not only a large amount of lubricating oil is retained in the deep grooves 15 and the shallow grooves 16 in the clearance between the inner surface of the plain bearing and the rotating shaft 3, but also each of side wall portions between the adjacent deep and shallow grooves 15, 16 and between the adjacent shallow grooves 16 functions as a bank which offers a resistance when the lubricating oil outflowing in the axial direction, and thus an inflow pressure when the lubricating oil flowing into a clearance between the inner surface of the bearing and the rotating shaft 3 increases, a stable thick oil film having a high oil pressure is formed between the bearing metals 10a, 10b and the rotating shaft 3. The anti-seizure property and the wear-resistant property of the bearing metals, which is liable to occur in particular during the initial running-in period, can be enhanced by virtue of the presence of such a stable thick oil film.

Even when the plain bearing is used during a long time, as a result, the shallow grooves 16 have been worn out by wear and tear, the lubricating oil is retained by the deep grooves 15, as shown by a dash and dotted line, at the same time a high inflow pressure when the lubricating oil flowing into a clearance between the inner surface of the bearing and the rotating shaft 3 is maintained so that the anti-seizure property and the wear-resistant property can be stably maintained without rapidly losing the effect obtained by the fine grooves 11. Further, the longitudinal sectional shapes of the deep grooves 15 and the shallow grooves 16 are not limited to the V shape as shown in FIG. 3, but may be carried out by appropriately modifying them as described hereinbelow.

Figure 3:
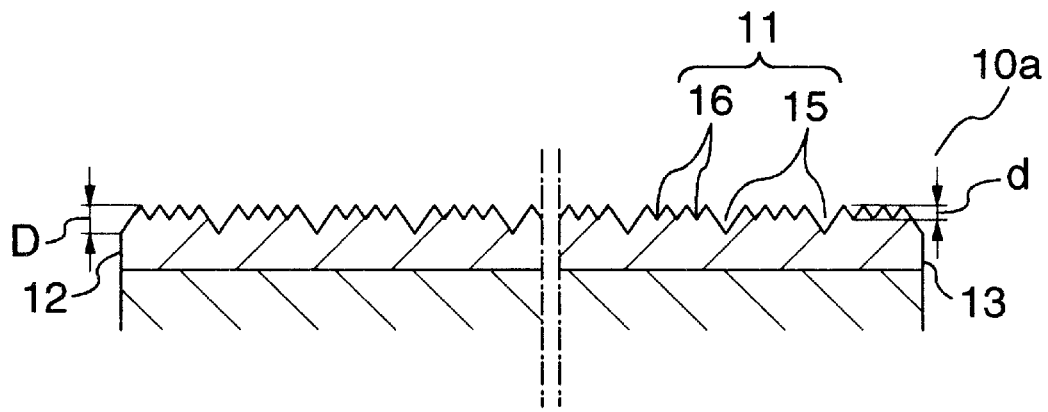
FIG. 3 is a sectional view of a portion of a bearing metal according to an embodiement of the present invention.
Figure 5:
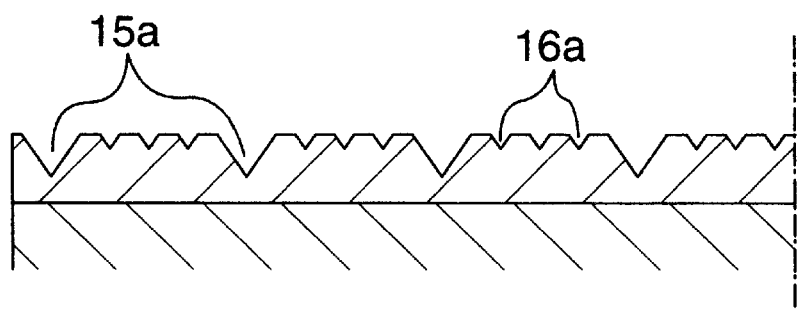
FIG. 5 is a sectional view of a portion of a bearing metal according to another embodiement of the present invention.

FIG. 5 shows another embodiment of the plain bearing in which each of the portions between the adjacent grooves 15a and 16a and between the adjacent grooves 16a has a flat top surface to thereby increase the area which is subjected to the axial loading more than that of the embodiment as shown in FIG. 3, thus increasing the wear-resistant property of the bearing. Therefore, there is provided a plain bearing which is excellent in the wear-resistant property, particularly under a high load.

Figure 6:
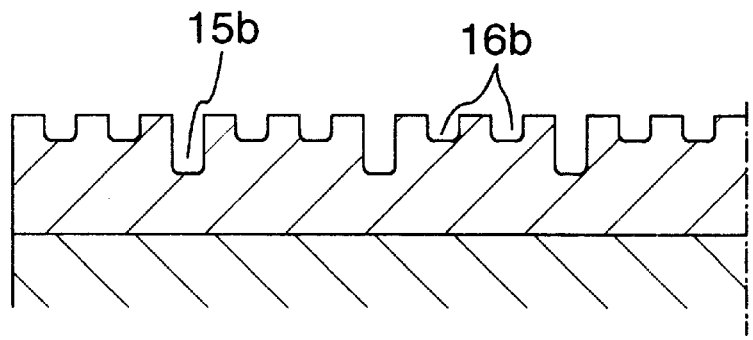
FIG. 6 is a sectional view of a portion of a bearing metal according to a still another embodiment of the present invention.

FIG. 6 shows still another embodiment of the plain bearing in which deep grooves 15b and shallow grooves 16b are formed on the inner surface of the bearing metal where each of the deep grooves 15b and the shallow grooves 16b has a flat bottom portion, and each of the portions which are left between the adjacent deep and shallow groove 15b, 16b and between the adjacent shallow grooves 16b, 16b has a flat top surface. In this embodiment, both the deep grooves 15b and the shallow grooves 16b are formed at intervals of the same pitch, and also a larger amount of lubricating oil can be retained in the deep grooves 15b and the shallow grooves 16b than that of the embodiment as shown in FIG. 3. Consequently, this embodiment may provide a plain bearing which is more suitable for a rotating shaft adapted to be rotated at a high speed than that of the embodiement as shown in FIG. 3. Further, until the shallow grooves 16b have been worn out by wear and tear, the area which is subjected to the axial loading remains unchanged, so that there is provided a plain bearing which is capable of maintaining a stable bearing property.

Figure 7:
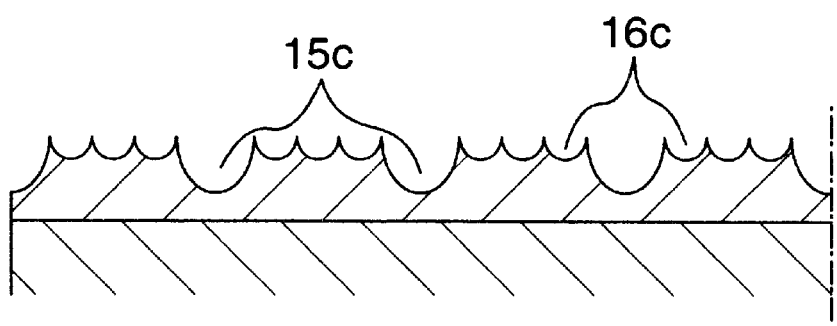
FIG. 7 is a sectional view of a portion of a bearing metal according to a further embodiment of the present invention.

FIG. 7 shows a further embodiment of the plain bearing in which both of deep grooves 15c and shallow grooves 16c are formed by two circular surfaces. This embodiment enables a larger amount of lubricating oil to be retained in each of the shallow grooves 16c than that of the embodiment as shown in FIG. 3. Therefore, this embodiment may provide a plain bearing which is more suitable for a rotating shaft adapted to be rotated at a high speed than that of the embodiment as shown in FIG. 3.

Figure 8:
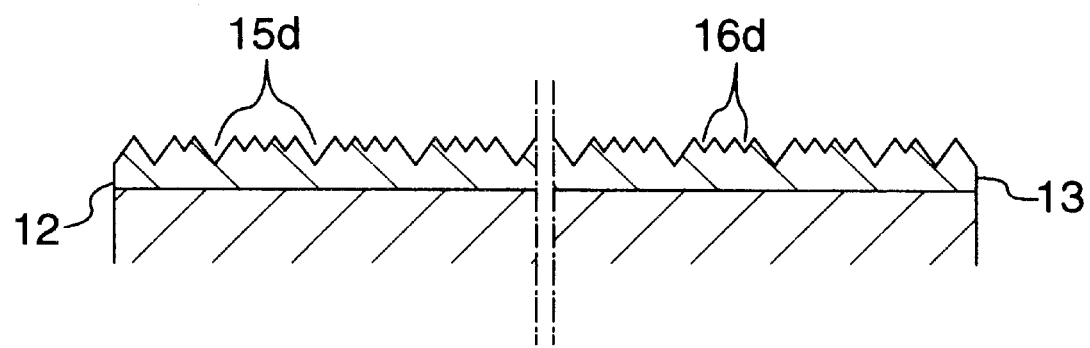
FIG. 8 is a sectional view of a portion of a bearing metal according to a still further embodiment of the present invention.

FIG. 8 shows a still further embodiment of the plain bearing in which a number of deep grooves 15d are formed in the vicinity of the axial both ends 12, 13 of the inner surface of the bearing, while a number of shallow grooves 16d are formed in the axial central portion on the inner surface of the bearing. By increasing the number of the deep grooves 15d in the vicinity of the axial both ends 12, 13 which are liable to be subjected to a high local specific load caused by a partial contact of the rotating shaft during the running-in period of the bearing, the amount of the lubricating oil can be increased, thereby reducing the possible seizure and frictional wear of the axial both ends 12, 13 still more.

While a number of preferred embodiments of the present invention have been described hereinabove, it is possible to appropriately select the depth of the deep grooves and the shallow grooves and the pitches therebetween and thus combine them. Further, the number of the shallow grooves to be formed between deep groove and the next deep groove may also be selected suitably.

Moreover, in a case wherein an overlay made of a lead alloy, a tin alloy, an alminum alloy or a synthetic resin is formed in an uneven manner on the inner surface of the bearing, or in a case wherein various grooves having the similar section shape to those of the above-mentioned embodiments are formed on the inner surface of the bearing, the same effects as mentioned above may be obtained.

Although the present invention has been described with reference to the preferred embodiments, those skilled in the art will recognize that changes and modifications thereof may be made in the form and details without departing from the spirit and scope of the present invention described in the appended claims.

What is claimed is:

1. A plain bearing defining an axial direction and including an inner bearing surface comprising:

circumferential fine grooves being substantially parallel with one another and spaced in the axial direction generally at a predetermined groove interval, said grooves being adapted to retain lubricating oil therewithin and between the inner surface of the bearing and a rotating shaft;

wherein the grooves comprise a plurality of groove groups, wherein each group of the plurality includes at least one first deep groove and a plurality of second shallow grooves, and wherein all first deep grooves are substantially of a same first depth and all second shallow grooves are substantially of a same second depth, whereby the oil is retained in the first deep groove if the second shallow grooves are worn down during a long time of use, such that an anti-seisure property is stably maintained.

2. The plain bearing as claimed in claim 1, wherein a number of said first deep grooves are formed in a vicinity of both axial ends of said plain bearing, and a number of said second shallow grooves are formed in an axial central portion of said plain bearing, whereby a larger amount of the oil is retained at the axial ends and conformability and wear-resistance of the bearing are enhanced.

3. A plain bearing having a plurality of fine open grooves which are circumferentially cut into the inner surface of said plain bearing, said fine open grooves being parallel with one another and extending at predetermined intervals in the axial direction of said plain bearing, whereby lubricating oil is retained between the inner surface of the bearing and a rotating shaft;

said fine open grooves being provided in adjacent groove groups, each said groove group comprising a first open groove having a deep depth, a plurality of second open grooves having a shallow depth, and a third open groove having a deep depth equivalent to depth of said first open groove, said plurality of second open grooves being sandwiched between said first and third open grooves, and wherein said first and third open grooves of said plurality of groove groups have the same depth, and said plurality of second open grooves of said plurality of groove groups have the same depth, whereby the oil is retained in the first open deep groove if the second open shallow grooves are worn down during a long time of use, such that an anti-seisure property is stably maintained.

4. The plain bearing of claim 3, wherein said third groove of a first group of grooves corresponds to a first groove of an adjacent group of grooves.

\* \* \* \* \*

UNITED STATES PATENT AND TRADEMARK OFFICE
CERTIFICATE OF CORRECTION

PATENT NO. : 6,089,756
DATED : July 18, 2000
INVENTOR(S) : Akira Ono et al.

Page 1 of 1

It is certified that error appears in the above-identified patent and that said Letters Patent is hereby corrected as shown below:

Title page,
Line [45], prior to "Jul." insert -- * --;

Title page,
After line [73], insert the following:
-- [*] Notice: This patent issued on a continued prosecution application filed under 37 CFR 1.53 (d), and is subject to the twenty year patent term provisions of 35 U.S.C. 154 (a) (2). --

Signed and Sealed this

Eighteenth Day of September, 2001

Attest:

*Nicholas P. Godici*

NICHOLAS P. GODICI
*Attesting Officer*    *Acting Director of the United States Patent and Trademark Office*